United States Patent
Lutjen et al.

(10) Patent No.: US 8,128,348 B2
(45) Date of Patent: Mar. 6, 2012

(54) SEGMENTED COOLING AIR CAVITY FOR TURBINE COMPONENT

(75) Inventors: Paul M. Lutjen, Kennebunkport, ME (US); Susan M. Tholen, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 1467 days.

(21) Appl. No.: 11/861,662

(22) Filed: Sep. 26, 2007

(65) Prior Publication Data

US 2009/0081025 A1    Mar. 26, 2009

(51) Int. Cl.
  *F01D 11/08*  (2006.01)
(52) U.S. Cl. .................................................. 415/173.1
(58) Field of Classification Search ........... 415/173.1, 415/115; 164/365, 369, 397
  See application file for complete search history.

(56) References Cited

U.S. PATENT DOCUMENTS

| | | | |
|---|---|---|---|
| 4,213,296 A | 7/1980 | Schwarz | |
| 4,257,222 A | 3/1981 | Schwarz | |
| 4,318,668 A | 3/1982 | Chaplin | |
| 4,650,394 A | 3/1987 | Weidner | |
| 5,211,536 A | 5/1993 | Ackerman | |
| 5,224,822 A | 7/1993 | Lenahan | |
| 5,375,973 A | 12/1994 | Sloop | |
| 5,902,093 A * | 5/1999 | Liotta et al. | 416/97 R |
| 5,961,279 A | 10/1999 | Ingistov | |
| 6,109,663 A | 8/2000 | Hayton | |
| 6,340,047 B1 * | 1/2002 | Frey | 164/137 |
| 6,905,302 B2 * | 6/2005 | Lee et al. | 415/115 |
| 7,059,827 B1 | 6/2006 | Ingistov | |
| 7,377,746 B2 * | 5/2008 | Brassfield et al. | 416/97 R |
| 7,517,189 B2 * | 4/2009 | Camus | 415/173.1 |
| 7,650,926 B2 * | 1/2010 | Tholen | 164/516 |

* cited by examiner

*Primary Examiner* — Ninh H Nguyen
(74) *Attorney, Agent, or Firm* — Carlson, Gaskey & Olds, PC

(57) ABSTRACT

A component for a gas turbine engine has an airfoil with internal cooling channels for delivering air from a radially outer end of the airfoil toward a radially inner end of the airfoil. The cooling channels are separated from adjacent cooling channels by sets of at least two disconnected wall segments.

20 Claims, 3 Drawing Sheets

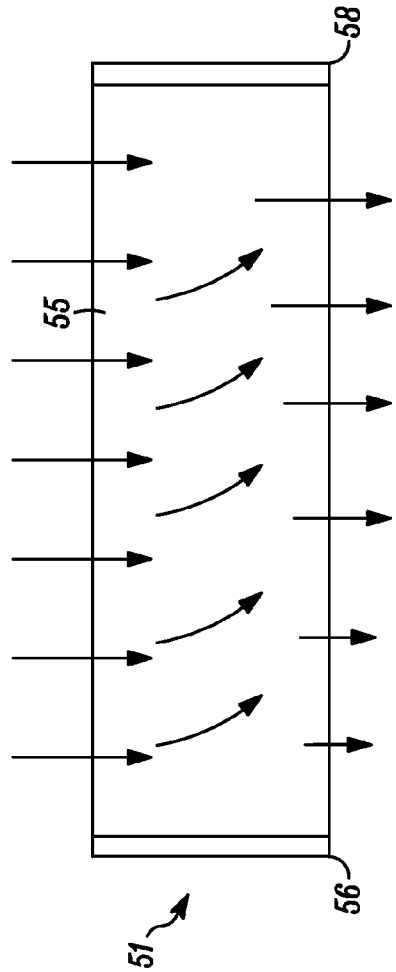
FIG. 2C *Prior Art*
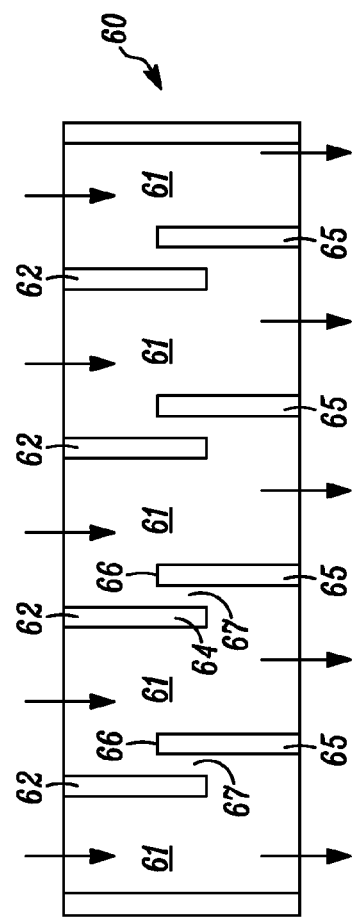
FIG. 3
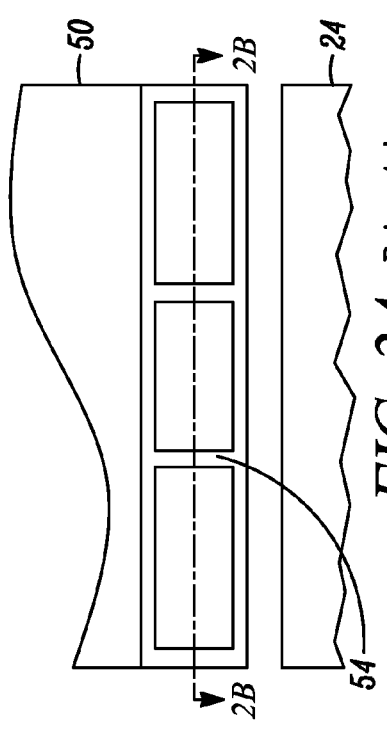
FIG. 2A *Prior Art*
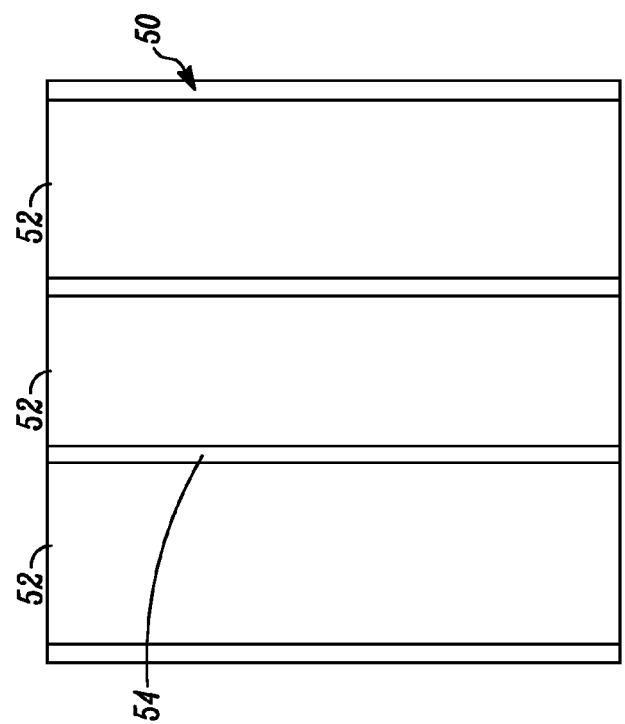
FIG. 2B *Prior Art*

US 8,128,348 B2

SEGMENTED COOLING AIR CAVITY FOR TURBINE COMPONENT

This invention was made with government support under Contract No. F33615-03-D-2354 (DO:0009) awarded by the United States Air Force. The government therefore has certain rights in this invention.

BACKGROUND OF THE INVENTION

This application relates to segmented cooling cavities for use within a turbine component having an air cooled blade outer air seal.

Gas turbine engines are known, and typically include a compressor compressing air and delivering it downstream into a combustion section. The air is mixed with fuel in the combustion section and combusted. Products of this combustion pass downstream over turbine rotors, driving the turbine rotors to rotate and create power.

Typically, the turbine rotors include a plurality of removable blades. Blade outer air seals are positioned adjacent a radially outer portion of the blades, to provide a tight clearance across the rotors such that air is restricted to flow over the rotors, rather than bypassing them. These blade outer air seals are subjected to a very harsh and hot environment due to the products of combustion. Thus, it is known to deliver cooling air to blade outer air seals.

A blade outer air seal typically has a leading edge and a trailing edge, defined in terms of the turbine gas flow direction. The pressure across the blade outer air seal drops since the products of combustion are transferring their pressure into energy to drive the turbine rotors. Thus, at the leading edge, the pressure is significantly higher than at the trailing edge. As an example, the pressure could be as much as twice as high as the leading edge as it is at the trailing edge.

This causes some issues with regard to the flow of cooling air within the blade outer air seal. In some prior art blade outer air seals, a single large cooling channel extends across the entire axial length of the seal, from leading to trailing edge. In such an arrangement, less air will exit at the leading edge compared to the trailing edge. This is because the cooling air will seek the lowest pressure, and will thus tend to flow more toward the trailing edge.

One solution to this problem has been the use of a plurality of separate cooling channels spaced along the length of the airfoil. These separate channels do limit the effect of the pressure differential between leading edge and the trailing edge. However, the use of the separate channels complicates the manufacture of the airfoil.

Most components for gas turbine engines containing an airfoil are formed by a loss core molding process. In such a process, a core is initially formed of a particular material. That core is inserted into a mold, and molten metal is directed into the mold and around the core. After the molten metal has hardened, the material of the core is leached away, leaving a cavity where the core once sat. This is typically the manner in which cooling channels are formed. To form the separate channels as mentioned above, the core must have a plurality of separate core members, or alternatively, a plurality of spaced core fingers. The use of several cores is complex, and the use of a single core with separate spaced fingers is not as structurally robust as may be desirable.

SUMMARY OF THE INVENTION

In the disclosed embodiment of this invention, a plurality of segmented cooling channels are formed within a blade outer air seal for a gas turbine engine by disconnected wall members. The wall members have overlapping extents, but do not directly contact each other. In this manner, a single robust core member can be utilized to form multiple semi-discrete channels for one or all cooling cavities within a blade outer air seal.

These and other features of the present invention can be best understood from the following specification and drawings, the following of which is a brief description.

BRIEF DESCRIPTION OF THE DRAWINGS

FIG. 2A schematically shows one portion of a prior art blade outer air seal.
FIG. 2B is a second view of FIG. 2A.
FIG. 2C shows a problem with a second prior art blade outer air seal.
FIG. 3 shows a cross-sectional view of an inventive blade outer air seal.

DETAILED DESCRIPTION OF THE PREFERRED EMBODIMENT

Figure 1:
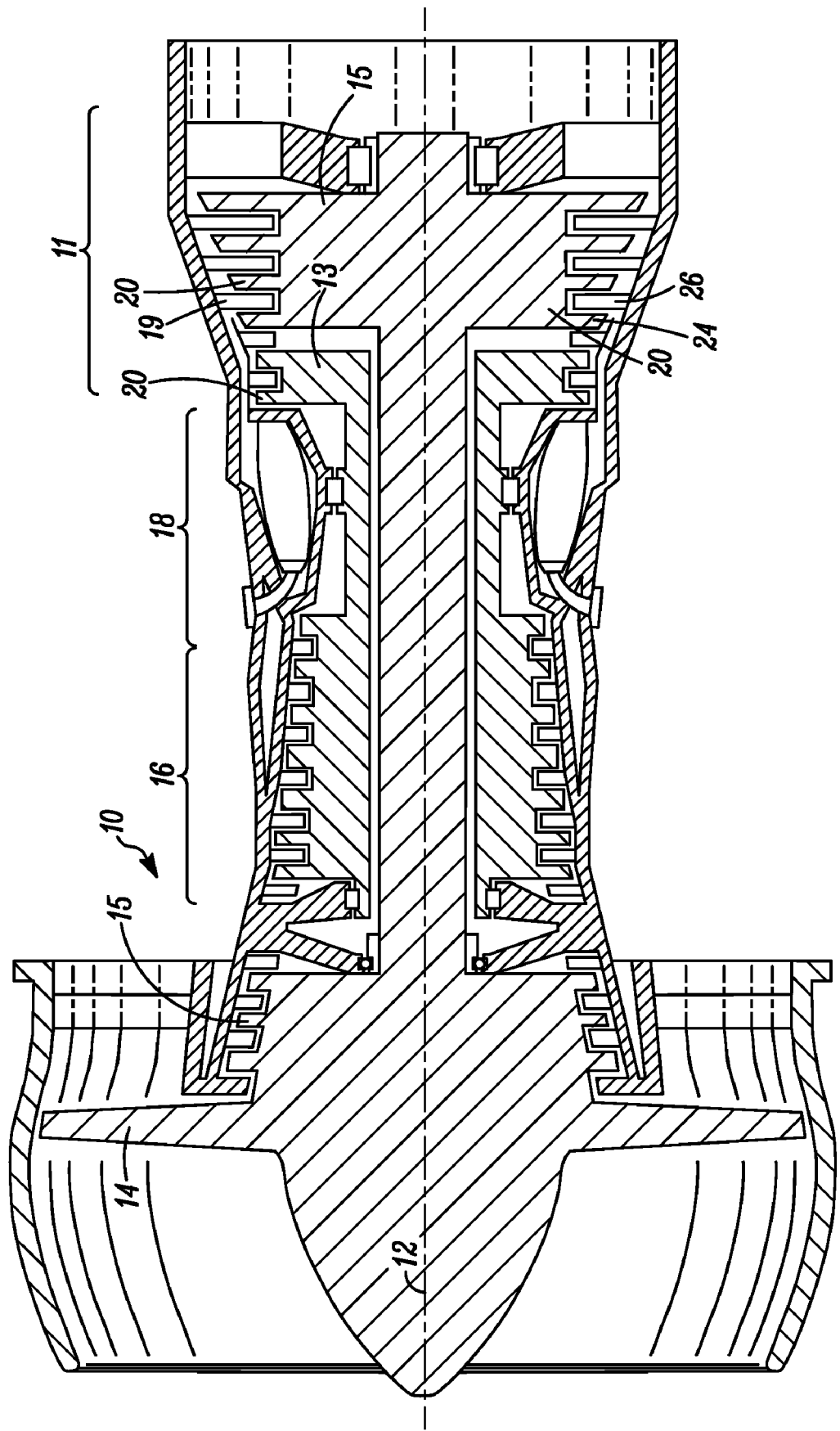
FIG. 1 schematically shows a gas turbine engine.

A gas turbine engine 10, such as a turbofan gas turbine engine, circumferentially disposed about an engine centerline 12, is shown in FIG. 1. The engine 10 includes a fan 14, compressors 15 and 16, a combustion section 18 and a turbine section 20. Turbine section 20 includes rotors 13 and 15. As is well known in the art, air compressed in the compressors 15 and 16 is mixed with fuel and burned in the combustion section 18, and expanded across turbine rotors 13 and 15. Turbine rotors 13 and 15 rotate in response to the expansion, driving the compressors 15 and 16, and fan 14. Turbine rotor 13 and 15 comprise alternating rows of rotary airfoils or blades 24 spaced from static airfoils or vanes 26. This structure is shown quite schematically in FIG. 1. While one example gas turbine engine is illustrated, it should be understood this invention extends to any other type gas turbine engine for any application.

FIGS. 2A and 2B show the circumferential edge portion of an existing blade outer air seal 50. As shown, a plurality of cooling channels 52 are separated by spaced walls 54. To form the separate channels 52, a plurality of separate cores must be utilized during a molding process. The channels may be circumferentially or radially oriented, depending on the details of the particular cooling scheme. In the figures shown, the channels are oriented circumferentially with air exiting in the gap between seal segments.

On the other hand, if the separate cooling channels 52 are not used then a problem as illustrated in FIG. 2C will occur. As shown, a core for a blade outer air seal 51 has a single large cooling channel 55, and a leading edge 56 and a trailing edge 58. The pressure drop between the leading edge 56 and the trailing edge 58 may be dramatic. It is not unusual for pressures to be approximately half adjacent the trailing edge as they are at the leading edge. Thus, as shown schematically in FIG. 2C, a good deal of the cooling air directed into the blade outer air seal 51 will tend to flow toward the trailing edge 58, and smaller quantities of air reach the leading edge 56. On the other hand, the cooling air may be more important adjacent the leading edge 56, if the leading edge is hotter than the trailing edge. Adjusting exit hole sizes may aid in adjusting the flow somewhat, but this provides only limited control and may produce other problems such as plugging of tiny holes.

As mentioned above, one known solution to address this problem is the use of the separate cooling channels (see blade outer seal 50 in FIG. 2B); however, they are somewhat complex to form.

FIG. 3 schematically shows an inventive blade outer air seal 60 having a unique cooling scheme. The walls between separate cooling channels 61 are formed by spaced cooling wall segments 62 and 65. The upstream cooling wall segments 62 have an inner end 64 which overlaps with an outer end 66 of a downstream wall segment 65. Note that in this case, the terms upstream and downstream refer to the flow of the cooling air inside the seal, not the gas flow in the turbine which define the leading and trailing edge of the part. A gap 67 between the wall segments 62 and 66 will allow a single core to be used to form the blade outer air seal 60, as will be explained below. Now, the benefits of the multi-channel cooling scheme as mentioned above are achieved in that the separating wall segments 62 and 65 do not allow the air to move too far downstream. Gap 67 presents a small and torturous path, so it is unlikely any significant volume of air would move back through the gap 67. Air would not move from the trailing edge channel downstream toward the adjacent leading edge channel due to the pressure differential. As is clear, the segments 65 and 62 have sets of opposed portions with each of the wall segments 62 and 65 to define each of the channels 61. Stated another way, there is a wall segment 62 associated with a wall segment 65, and another pair of associated wall segments 62/65 spaced on an opposed side of the channel together, with the four wall segments defining each of the channels 61. As is also clear, the wall segments 62 are positioned to be toward an upstream end relative to the wall segment 65 in each of the associated sets. The gap 67 would communicate between adjacent channels 61, however, since there is this small torturous path, leakage will be minimal.

Figure 4:
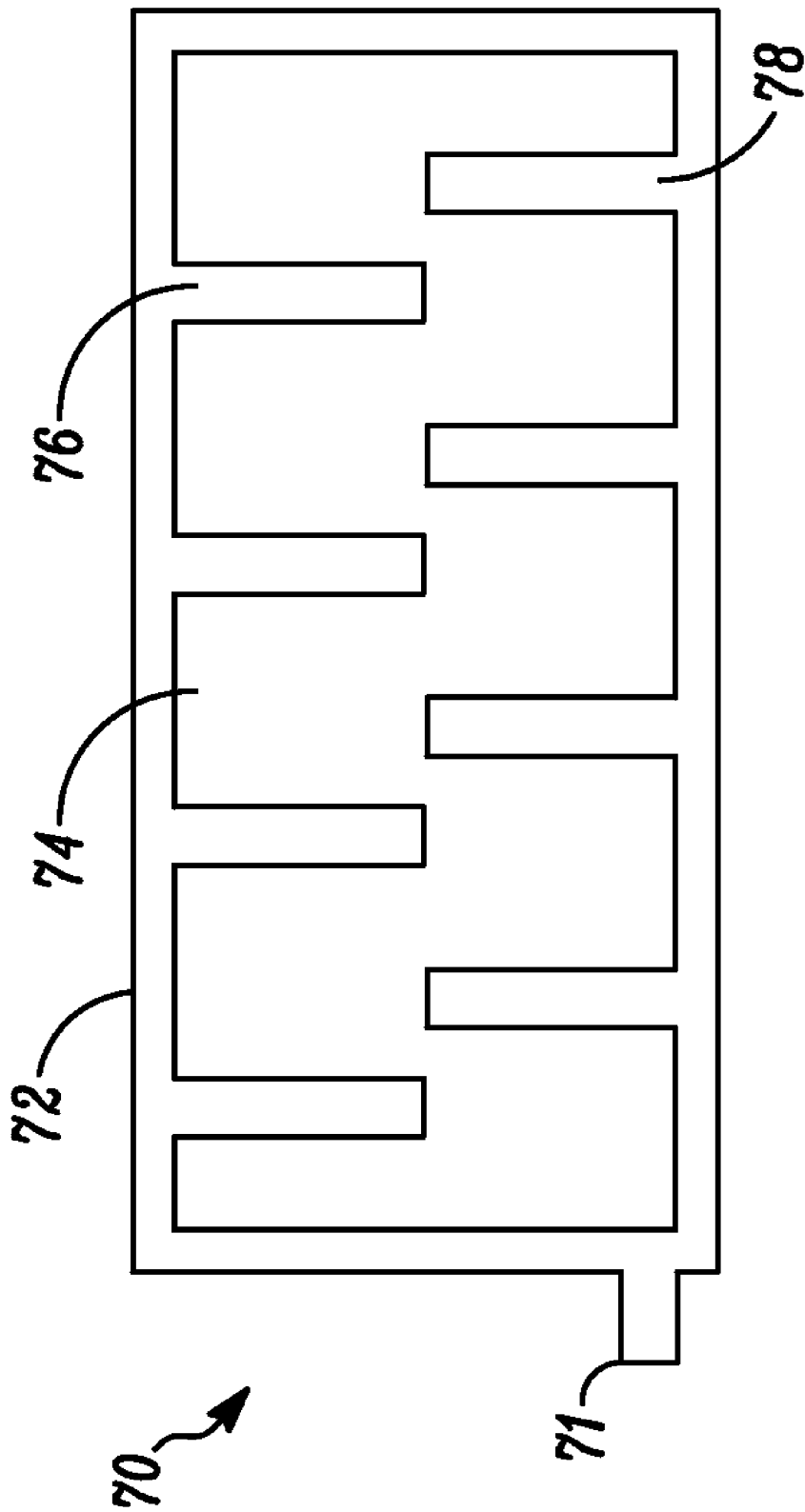
FIG. 4 is a first view of a mold for forming the inventive blade outer air seal.

FIG. 4 shows a mold system 70 for forming the blade outer seal 60. Of course, the mold system 70 is shown extremely schematically. A mold housing 72 has an inlet 71 for receiving a molten metal. A core 74 is formed having a plurality of slots 76 and 78. As a worker in the art of forming gas turbine engine air foil components would understand, the core 74 exists in areas that will provide a space in the final blade outer air seal. The slots 76 and 78 will form the wall segments 62 and 65. Metal is injected through the inlet 71 into the mold 72, and is deposited around the core 74. The core is later leached away, leaving an internal flow structure such as shown in FIG. 3.

While the channels are shown as circumferential channels at an edge periphery of a blade outer air seal, these concepts can also be used in radially extending channels, and also in components other than blade outer air seals.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A component for a gas turbine engine comprising:
    said component having internal cooling channels for delivering air; and
    said cooling channels being separate from adjacent cooling channels by sets of at least two disconnected wall segments, with a first set of said disconnected wall segments extending inwardly from an outer point and a second set of said disconnected wall segments extending outwardly from an inner point.

2. The component as set forth in claim 1, wherein said first set of said disconnected wall segments is spaced toward a leading edge relative to an associated disconnected wall segment in said second set.

3. The component as set forth in claim 2, wherein said disconnected wall segments in said second set extends to a circumferential extent that is circumferentially beyond a circumferential extent of said disconnected wall segments in said first set.

4. The component as set forth in claim 3, wherein said disconnected wall segments in said first set is associated with a disconnected wall segment in said second set, and ends of said associated disconnected wall segments extending beyond each other, with a gap defined between said associated wall segments, with said gap providing a path communicating adjacent ones of said cooling channels.

5. The component as set forth in claim 1, wherein said disconnected wall segments in said second set extend to an outermost extent that is beyond an innermost extent of said disconnected wall segments in said first set.

6. The component as set forth in claim 1, wherein said component is a blade outer air seal.

7. The component as set forth in claim 1, wherein said cooling channels are separated by only two of said disconnected wall segments.

8. The component as set forth in claim 1, wherein one of said disconnected wall segments in said first set being associated with one of said disconnected wall segments in said second set, and one of said associated disconnected wall segments in said first and second sets being positioned towards a leading edge of said component relative to the location of the other of said associated disconnected wall segments.

9. The component as set forth in claim 8, wherein each of said cooling channels are defined between a pair of spaced ones of said disconnected wall segments in said first set, and then between said disconnected wall segments in said second set.

10. A gas turbine engine comprising:
    a compressor;
    a combustion section; and
    a turbine section, said turbine section including at least one component having cooling channels for delivering air; and
    said cooling channels being separate from adjacent cooling channels by sets of at least two disconnected wall segments, with a first set of said disconnected wall segments extending inwardly from an outer point and a second set of said disconnected wall segments extending outwardly from an inner point.

11. The gas turbine engine as set forth in claim 10, wherein said first set of said disconnected wall segments is spaced toward a leading edge relative to an associated disconnected wall segment in said second set.

12. The gas turbine engine as set forth in claim 11, wherein said disconnected wall segments in said second set extend to a circumferential extent that is circumferentially beyond a circumferential extent of said disconnected wall segments in said first set.

13. The gas turbine engine as set forth in claim 12, wherein said disconnected wall segments in said first set is associated with a disconnected wall segment in said second set, and ends of said associated disconnected wall segments extending beyond each other, with a gap defined between said associated wall segments, with said gap providing a path to communicate adjacent ones of said cooling channels.

14. The gas turbine engine as set forth in claim 10, wherein said disconnected wall segments in said second set extend to an outermost extent that is beyond an innermost extent of said disconnected wall segments in said first set.

15. The gas turbine engine as set forth in claim 10, wherein said component is a blade outer air seal.

16. The gas turbine engine as set forth in claim 10, wherein said cooling channels are separated by only two of said disconnected wall segments.

17. The gas turbine engine as set forth in claim 10, wherein one of said disconnected wall segments in said first set being associated with one of said disconnected wall segments in said second set, and one of said associated disconnected wall segments in said first and second sets being positioned towards a leading edge of said component relative to the location of the other of said associated disconnected wall segments.

18. The gas turbine engine as set forth in claim 10, wherein each of said cooling channels are defined between a pair of spaced ones of said disconnected wall segments in said first set, and then between said disconnected wall segments in said second set.

19. A method of forming a component for a gas turbine engine comprising the steps of:
   1) providing a core, said core having a generally solid shape, and a plurality of spaced slots at a radially outer end and at a radially inner end;
   2) placing said core in a mold, and injecting molten metal around said core;
   3) leaching said core to leave a hollow space within a gas turbine engine component containing an airfoil, with said slots in said core forming disconnected wall segments with a series of outer wall segments extending inwardly and a series of inner wall segments extending outwardly.

20. The method as set forth in claim 19, wherein said outer wall segments extend circumferentially inward from a first circumferential side, and said inner wall segments extending circumferentially outward towards a second circumferential side.

* * * * *